(12) United States Patent
Goken et al.

(10) Patent No.: US 11,700,040 B2
(45) Date of Patent: Jul. 11, 2023

(54) METHOD FOR ENHANCING THE PERFORMANCE OF DOWNLINK MULTI-USER MIMO SYSTEMS

(71) Applicant: ASELSAN ELEKTRONIK SANAYI VE TICARET ANONIM SIRKETI, Ankara (TR)

(72) Inventors: Cagri Goken, Ankara (TR); Onur Dizdar, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 17/785,418

(22) PCT Filed: Mar. 26, 2020

(86) PCT No.: PCT/TR2020/050239

§ 371 (c)(1),
(2) Date: Jun. 15, 2022

(87) PCT Pub. No.: WO2021/194435

PCT Pub. Date: Sep. 30, 2021

(65) Prior Publication Data

US 2023/0015903 A1    Jan. 19, 2023

(51) Int. Cl.
*H04L 1/02*    (2006.01)
*H04B 7/0452*    (2017.01)
(Continued)

(52) U.S. Cl.
CPC .......... *H04B 7/0452* (2013.01); *H04B 7/0456* (2013.01); *H04L 1/0042* (2013.01);
(Continued)

(58) Field of Classification Search
CPC ........ H04B 1/16; H04L 1/0068; H04L 1/0618;
(Continued)

(56) References Cited

U.S. PATENT DOCUMENTS

2018/0351696 A1* 12/2018 Yang et al. .......... H04L 1/0041
2019/0052487 A1    2/2019 Shelby et al.
(Continued)

FOREIGN PATENT DOCUMENTS

WO    2009106994 A2    9/2009
WO    2019095279 A1    5/2019

OTHER PUBLICATIONS

Lei Dong, et al., Introduction on IMT-2020 5G Trials in China, IEEE Journal on Selected Areas in Communications, 2017, pp.1849-1866, Vol.35, No.8.

*Primary Examiner* — Khai Tran
(74) *Attorney, Agent, or Firm* — Bayramoglu Law Offices LLC

(57) ABSTRACT

A method is based on the user-specific frozen bit patterns of polar codes assigned to users. At the transmitter, the binary-valued user-specific frozen bit pattern sequences to be used in frozen bit locations are determined for each user, the information bits of each user are encoded using a polar encoder, and the binary-valued user-specific frozen bit patterns are used in frozen bit locations during encoding operation to improve the performance of the downlink multi-user MIMO system. Coded bits are mapped to symbols to be transmitted, and the symbols are mapped to the MIMO layers. Then, multi-antenna precoding is applied and baseband-to-RF processing is performed onto the precoded symbols to transmit the signal. The signal of all users is transmitted at the same time-frequency resources using transmit antennas. Each receiver receives the transmitted signal which is transmitted through respective downlink channels.
(Continued)

Each user performs RF-to-baseband processing to their respective received signal.

6 Claims, 5 Drawing Sheets

(51) Int. Cl.
*H04B 7/0456* (2017.01)
*H04L 1/00* (2006.01)

(52) U.S. Cl.
CPC ................................ *H04L 1/0048* (2013.01); *H04L 1/0057* (2013.01)

(58) Field of Classification Search
CPC ...... H04L 1/06; H03M 13/13; H03M 13/1191; H03M 13/1165
USPC ........................................................ 375/267
See application file for complete search history.

(56) References Cited

U.S. PATENT DOCUMENTS

2020/0403728 A1* 12/2020 Chen et al. .......... H04L 1/0061

* cited by examiner

METHOD FOR ENHANCING THE PERFORMANCE OF DOWNLINK MULTI-USER MIMO SYSTEMS

CROSS REFERENCES TO THE RELATED APPLICATIONS

This application is the national phase entry of International Application No. PCT/TR2020/050239, filed on Mar. 26, 2020, the entire contents of which are incorporated herein by reference.

TECHNICAL FIELD

The present invention relates to the field of communication and particularly to downlink multi-user multi-input multi-output communication methods.

BACKGROUND

Multi-user access can be carried out through different multiple access schemes. Specifically, frequency division multiple access (FDMA), time division multiple access (TDMA), code division multiple access (CDMA), space division multiple access (SDMA) and orthogonal frequency division multiple access (OFDMA) have been utilized in various communication systems. Multiple access methods may be orthogonal or non-orthogonal. In orthogonal multiple access (OMA) schemes, the users can share the resources orthogonally in frequency, time or code domain whereas non-orthogonal multiple access schemes are based on the idea that multiple users share the same resource block (e.g. time slot, subcarrier group) via non-orthogonal resource allocation.

SDMA is a multiple-access method based on separating multi-user data in space domain. This is accomplished by using multiple-antennas at the transmitter and specifically designed precoders. SDMA is a type of multi-user multiple-input multiple-output (MU-MIMO) scheme.

MIMO is a technique that uses multiple antennas at the transmitter and receiver in order to achieve spatial diversity and/or improve the spectral efficiency. The spatial diversity is achieved using appropriate methods at the transmitter, such as space-time or space-frequency coding. The spectral efficiency is improved by transmitting data in multiple layers. In multi-layer single user MIMO (SU-MIMO), the data is transmitted to a specific user using appropriate methods at the transmitter, such as precoding. The receiver employs detection techniques to recover the transmitted signal by combining the signals at the multiple receive antennas.

In MU-MIMO, the aim is to improve the total system spectral efficiency by transmitting data in multiple layers to multiple users, where each user has a specific number of data layers. The user layers are separated spatially using multiple antennas at the transmitter and appropriate precoding methods.

The performance of MU-MIMO depends on the multi-user interference levels at each receiver. The multi-user interference suppression is achieved by precoding at the transmitter. Precoding at the transmitter requires channel state information at the transmitter (CSIT) for each user. The performance of the system depends on the employed precoding method and the quality of CSIT. Because of the estimation errors at each user and the quantization of the feedback information which can include channel statistics or an index for precoding matrix, the channel state information at the transmitter is imperfect. Also, there is a feedback delay in many practical communication systems between the measurements performed at each user and the precoding operation based on these measurements. In the case of mobility and time-varying channel conditions, the feedback delay reduces the quality of CSIT as the measurements become outdated. Because of imperfect CSIT, the selected precoder in the transmitter can be suboptimal, causing insufficient suppression of the multi-user interference at the receivers and degrading the overall system performance. Furthermore, the performance degradation can occur when some of the receivers are closely located spatially due to imperfect user grouping so that the precoding cannot separate the signals of each users. Another limiting factor for performance of downlink MU-MIMO systems is the user overloading, which means that there are more users than the number of transmit antennas so that the multi-antenna precoding cannot suppress the interference between users sufficiently.

Therefore, there is a need in the art for performance improvement methods for downlink MU-MIMO systems under insufficient multi-user interference suppression, which can occur due to overloading or imperfect CSI and user grouping at the transmitter The application numbered WO2009106994A2 presents multi-user MIMO systems with imperfect CSIT and ARQ. A robust closed-loop cross-layer design provides for the downlink multi-user multi-antenna systems with imperfect Channel State Information at the transmitter (CSIT) for slow fading channels. However, this document does not disclose a method based on frozen bit patterns of polar codes to improve the performance of downlink MU-MIMO systems with imperfect CSIT and user.

SUMMARY

The present invention provides a method for enhancing the performance of downlink multi-user MIMO systems with insufficient multi-user interference suppression. The method is based on the user-specific frozen bit patterns of polar codes assigned to users. At the transmitter, the binary-valued user-specific frozen bit pattern sequences to be used in frozen bit locations are determined for each user, the information bits of each user are encoded using a polar encoder, and the binary-valued, user-specific frozen bit patterns are used in frozen bit locations during encoding operation to improve the performance of the downlink multi-user MIMO system. Coded bits are mapped to symbols to be transmitted, and the symbols are mapped to the MIMO layers. Then, multi-antenna precoding is applied and baseband-to-RF processing is performed onto the precoded symbols to transmit the signal. The signal of all users is transmitted at the same time-frequency resources using transmit antennas, each receiver receives the transmitted signal which is transmitted through respective downlink channels. Each user performs RF-to-baseband processing to their respective received signal. Then, each receiver performs equalization and LLR calculation on the baseband signal and polar decoder decodes user data using the respective binary-valued frozen bit pattern of the user, wherein the user-specific frozen bit pattern aids the polar decoder operating under multi-user interference to improve the performance of the downlink multi-user MIMO system.

DETAILED DESCRIPTION

Hereinafter, the detailed descriptions of the embodiments of the present disclosure will be given with accompanying drawings.

The main embodiment provides a description of performance enhancement method for downlink MU-MIMO system under imperfect CSIT and user grouping. The disclosed performance enhancement is achieved using polar encoding with user specific frozen bit patterns at the transmitter, and performing polar decoding with the aid of user-specific frozen bit patterns at the receiver. Using user-specific frozen bit patterns increases the probability of a polar decoder to decode information bits of a user of interest correctly in the presence of multi-user interference. This leads to improved error performance compared to downlink MU-MIMO systems which does not employ the disclosed method under similar interference conditions.

Figure 3:
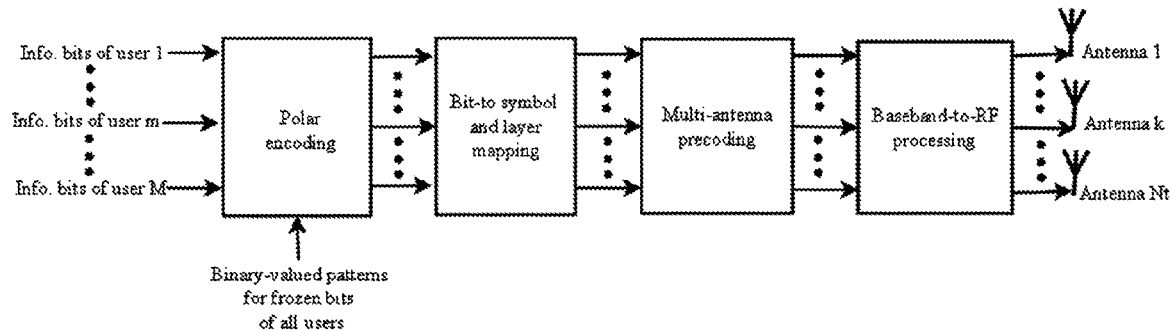
FIG. 3 shows the procedure to generate the transmitted signal at the transmitter according to disclosed method

The procedure to generate the transmitted signal at the transmitter of the disclosed enhancement method is given in FIG. 3.

Herein, the information bits represent the uncoded data bits coming from information source at the transmitter to be transmitted to each user. The information bits of each user are first encoded separately using a polar encoder, and the binary-valued, user-specific frozen bit patterns are used in frozen bit locations during the encoding operation. Coded bits are mapped to symbols to be transmitted, and the symbols are mapped to the MIMO layers. Then, multi-antenna precoding is applied and baseband-to-RF processing is performed onto the precoded symbols to transmit the signal using transmit antennas.

In one example of this embodiment, the information bits in FIG. 3 are formed appending the data bits coming from information source in the transmitter and the CRC-bits, which are generated according to a CRC-generating polynomial and the user data bits. CRC-generating polynomial may be a user-specific polynomial or it may be a predefined polynomial to be used by all users.

Figure 4:
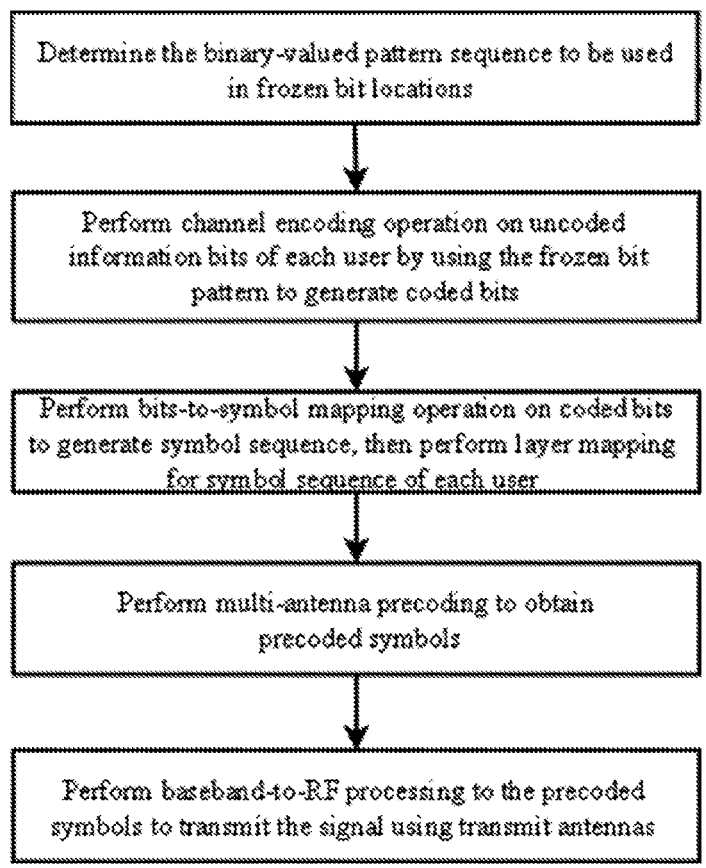
FIG. 4 shows the flow-chart of the operations performed at the transmitter side of each user.

The flow-chart of the operations performed at the transmitter of the disclosed enhancement method is given in FIG. 4. In the first step of the present invention, the user-specific binary valued pattern sequence to be used in frozen bit locations of each user during polar encoding is determined based on preset rules and protocols known to both transmitter and receiver units. Herein, the length of pattern sequence is at most N-K, where K is an integer representing the length of uncoded information bit sequence and N is an integer representing the length of coded bit sequence.

For M receiver units, there needs to be M different frozen pattern sequences as a result of the first step of the present invention. The performance enhancement with present invention is achieved using user-specific different frozen bit patterns for each user. Herein, the frozen bit patterns do not necessarily carry any specific system identification information for the transmitter or receiver unit, and they are used and designed to separate the user codewords in the encoding process and to aid the polar decoder in the decoding procedure to improve the performance of a downlink MU-MIMO system under multi-user interference, which can occur due to imperfect CSIT or user. The performance improvement with user-specific frozen bit patterns of the polar codes for downlink MU-MIMO systems is closely related to the number of "aids" given to the polar decoder during the decoding process. A polar decoder is said to be aided when any partial-sum bit for the user in consideration differs from that of the user creating the interference. The probability of incorrect detection decreases as the number of different partial-sum values between frozen bit patterns of users increases. This fundamental observation is the main reason behind the improvement of the performance of downlink MU-MIMO systems with disclosed invention, therefore binary valued user-specific frozen bit pattern sequences are produced and used for polar encoding at the transmitter.

In one example, the frozen bit patterns of each user are chosen to satisfy the condition that number of different partial-sums between any user pairs in an M-user downlink MU-MIMO system is above the predetermined partial-sum number threshold. The generated sequence is stored at the transmitter to be processed during channel encoding, and the receiver unit also explicitly knows the pattern sequence.

In one example, each bit of binary valued pattern sequence to be used in frozen bit locations is generated according to a Bernoulli distribution with parameter p, which is a real number such that $0 \le p \le 1$. Herein, the p represents the probability of the value of the bit equal to 1 and 1-p is the probability of the value of the bit equal to 0. The generated sequence is stored in the transmitter to be processed during channel encoding, and the receiver unit also explicitly knows the pattern sequence.

In another example, binary valued pattern sequence to be used in frozen bit locations is selected among a preset generated pattern sequence table according to the index information sent from the receiver unit.

In the second step of the present invention, the information bits are first encoded using a polar encoder, and the binary-valued user-specific frozen bit patterns are used in frozen bit locations during encoding operation. For generic $N=2^n$, the encoding operation of polar codes can be written in vector-matrix multiplication form as $x = uG_N$.

Herein, x is a binary valued vector of length N carrying the coded bits, u is a binary valued uncoded bits vector of length N carrying the information and frozen bits, and $G_N$ is the N by N generator matrix. The location of frozen bits in u may be determined according to preset rules. In one example of this embodiment, the frozen bit locations are selected based on Monte-Carlo simulations using an all-frozen polar code and an SC decoder. In another example, the frozen bit locations are selected by using Gaussian approximation method to approximate Bhattacharyya parameters of polarized channels. The information bit locations in the uncoded bit vector u are listed in set A and frozen bit locations in the uncoded bit vector u are listed in set $A^c$. Herein, $A^c \cup A = \{0, \ldots, N-1\}$, and $A^c \cap A = \varnothing$.

Figure 2:
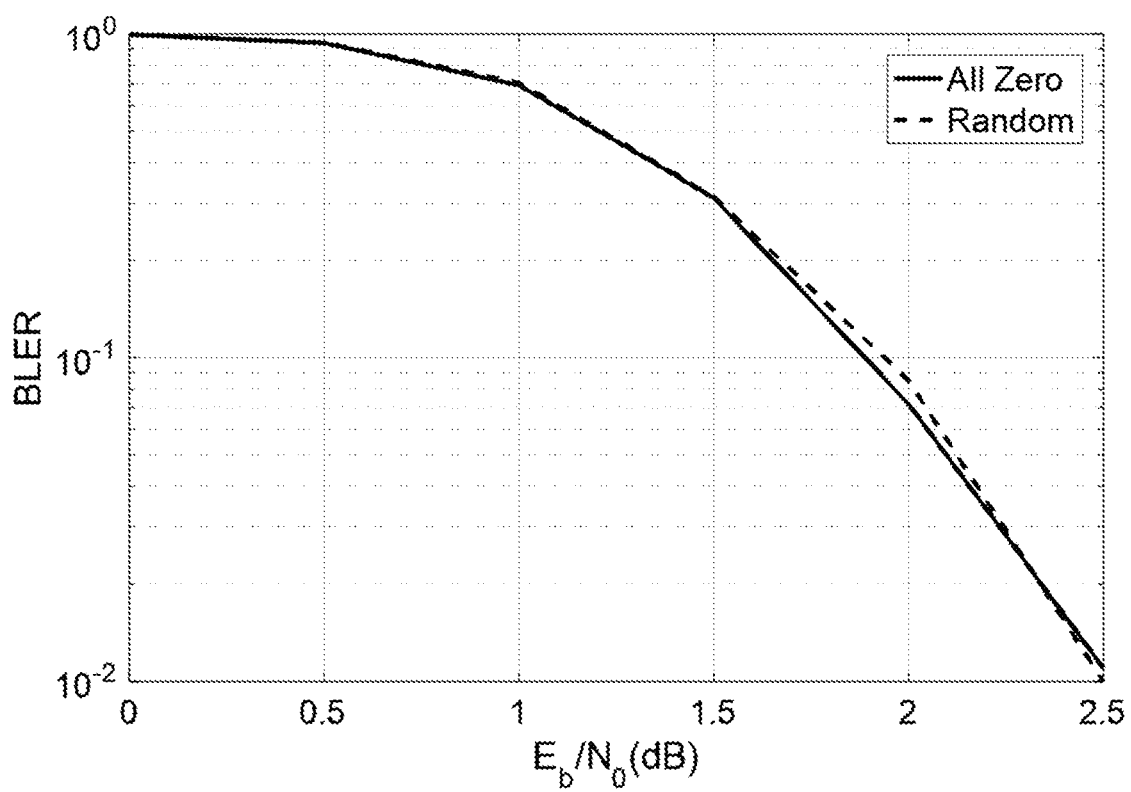
FIG. 2 shows the block error probability (BLER) of a polar code (1024,512) with all zero frozen bit pattern vector and a binary-valued random frozen bit pattern vector.

Frozen bit values of a polar code can be assigned a binary valued frozen bit pattern vector of length at most N-K. Error correction capability of a polar code for given frozen bit locations is independent of the frozen bit pattern vector, when the frozen bit locations and frozen bit pattern vector are known by the polar decoder. FIG. 2 shows the block error probability (BLER) of a polar code (1024,512) with all zero frozen bit pattern vector and a binary-valued random frozen bit pattern vector. This shows that using user-specific frozen bit patterns does not have any negative effect on the performance of the polar codes in the case of a single user.

In one example of this embodiment, the generator matrix $G_N$ is defined as $G_N = B_N F^{\otimes n}$ where $$F = \begin{bmatrix} 1 & 0 \\ 1 & 1 \end{bmatrix}$$

, and $F^{\otimes n}$ is n-th Kronecker power of the kernel matrix F. The matrix $B_N$ is the N by N bit-reversal matrix for a vector of length N. Bit-reversal operation can be described as follows: If the binary representation of an integer $k \in \{0, \ldots, N-1\}$ is denoted by $(i_0, \ldots, i_{n-1})$, the elements of vectors a and b of length-N have the relation $a_{(i0,\ldots,in-1)} = b_{(in-1,\ldots,i0)}$ if $a = bB_N$.

Figure 1:
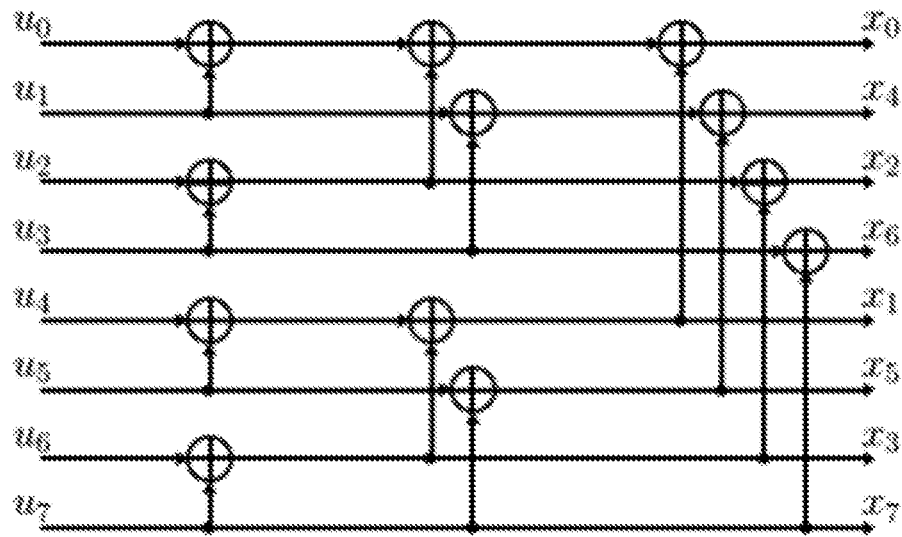
FIG. 1 shows polar encoder for bit-reversed polar encoding while N=8.

In another example, the encoding operation can be defined without bit-reversal operation such that $G_N = F^{\otimes n}$. An example polar encoder for bit-reversed polar encoding and N=8 is shown in FIG. 1.

Codebooks of polar codes for given frozen bit locations are disjoint if the binary-valued pattern sequence to be used in frozen bit locations are different. An example is given for two different non-bit reversed polar codes with N=4. The frozen bit locations are set to be $A^c = \{0, 1\}$. Binary valued pattern sequence to be used in frozen bit locations for the first polar code is chosen as $[u_0 \ u_1] = [0 \ 0]$ and it is chosen as $[u_0 \ u_1] = [0 \ 1]$ for the second polar code. Codebooks $C_1$ and $C_2$ for the example polar codes are given as:

$$[0 \ 0 \ u2 \ u3] \begin{bmatrix} 1 & 0 & 0 & 0 \\ 1 & 1 & 0 & 0 \\ 1 & 0 & 1 & 0 \\ 1 & 1 & 1 & 1 \end{bmatrix} \rightarrow C_1 = \begin{Bmatrix} (0 & 0 & 0 & 0) \\ (1 & 1 & 1 & 1) \\ (1 & 0 & 1 & 0) \\ (0 & 1 & 0 & 1) \end{Bmatrix}$$

$$[0 \ 1 \ u2 \ u3] \begin{bmatrix} 1 & 0 & 0 & 0 \\ 1 & 1 & 0 & 0 \\ 1 & 0 & 1 & 0 \\ 1 & 1 & 1 & 1 \end{bmatrix} \rightarrow C_2 = \begin{Bmatrix} (1 & 1 & 0 & 0) \\ (0 & 0 & 1 & 1) \\ (0 & 1 & 1 & 0) \\ (1 & 0 & 0 & 1) \end{Bmatrix}$$

The example shows that using different binary-valued frozen bit pattern sequences for each user separates the user codewords in the encoding process, which improves the system performance under multi-user interference.

In the third step of the present invention, the coded bits are mapped to symbols to be sent. The generated symbol sequences for each user are a set of complex-valued number representing the baseband signal to be transmitted. Then, layer mapping is performed on the symbol sequences of each user and all user layers are multiplexed to the precoder inputs.

In one example, this step includes modulation operation. Herein, the encoded bits are modulated using one of the modulation schemes including but not limited to $\pi/2$ BPSK, BPSK, QPSK, $\pi/4$ QPSK, 16-QAM, 64-QAM, 256-QAM.

In another example, this step includes scrambling and modulation operations. Herein, the scrambling operation is applied to the coded bits using a preset pseudo-random scrambling sequence, and scrambling sequence may be a user-specific sequence or it may be predefined sequence to be used by all users. The scrambled bits are modulated using one of the modulation schemes including but not limited to $\pi/2$ BPSK, BPSK, QPSK, $\pi/4$ QPSK, 16-QAM, 64-QAM, 256-QAM.

In still another example, this step includes interleaving and modulation operations. Herein, the interleaving operation is applied to the coded bits using a preset interleaver, and interleaver may be a user-specific interleaver or it may be a predefined interleaver to be used by all users. The interleaved bits are modulated using one of the modulation schemes including but not limited to $\pi/2$ BPSK, BPSK, QPSK, $\pi/4$ QPSK, 16-QAM, 64-QAM, 256-QAM.

In the fourth step of the present invention, multi-antenna precoding is performed on the precoder inputs to obtain the precoded symbols.

In one example, this step includes precoding by constructing a precoder matrix based on a CSI feedback delivered from multiple devices, wherein the CSI feedback from each user includes a precoding matrix indicator (PMI) information. Herein, first, the transmitter sends downlink reference signals such as CSI reference signals (CSI-RS) as in Long Term Evolution (LTE) and New Radio (NR) standards to each user. Each user receives the downlink reference signals and performs channel estimation for downlink radio channel. Then, each user chooses a precoder from a pre-determined set of possible precoders to optimize a metric. In one example, the pre-determined set of possible precoders is Type 2 CSI precoders defined in NR for MU-MIMO. As a CSI feedback to the transmitter, each user transmits an index information for their selected precoder, which is quantized according to certain rules given in the standards. Upon receiving the CSI feedback from all users, the transmitter performs user grouping and precoder combining for the grouped users to determine the precoder.

In another example, this step includes precoding by constructing a precoder matrix based on a CSI feedback delivered from multiple devices, wherein the CSI feedback includes the quantized version of the measured pre-defined channel statistics.

In one example, this step includes precoding by a Signal-to-Noise-Leakage-Ratio (SLNR) precoder by using the channel state information received from each user through feedback. In another example, this step includes precoding by Maximum-Ratio Transmission (MRT) precoder by using the channel state information received from each user through feedback. In another example, this step includes precoding by Zero-Forcing (ZF) precoder by using the channel state information received from each user through feedback. In yet another example, this step includes precoding by a precoder chosen according to a different metric than those aforementioned by using the channel state information received from each user through feedback.

In one example, this step includes precoding based on following steps: estimating the uplink channel between devices and the transmitter based on uplink Sounding Reference Signals (SRS) sent from each device to the transmitter, employing channel reciprocity principle to obtain CSIT for downlink channels and constructing a precoder based on estimated channel state information according to a metric.

In another example, this step includes precoding by constructing a precoder matrix based on a CSI feedback delivered from multiple devices, wherein there is a time-delay between the measurements performed at each user and the precoding operation based on these measurements.

In the fifth step of the present invention, baseband-to-RF processing is performed onto the precoded symbol sequences to generate the transmitted signal.

In one example, this step includes the operations for the signal generation for multiple transmit antenna downlink transmission using a single-carrier modulation including but not limited to Discrete Fourier Transform Spread Orthogonal Frequency Division Multiplexing (DFT-S-OFDM) In another example, this step includes the operations for the signal generation for multiple transmit antenna downlink transmission using an orthogonal multi-carrier modulation such as Cyclic-Prefix OFDM (CP-OFDM). In another example, this step includes the signal generation for multiple transmit antenna downlink transmission using a non-orthogonal multi-carrier modulation such as filtered OFDM (f-OFDM), Filter-Bank Multi-Carrier (FBMC), Universal Filtered Multi-Carrier (UFMC).

Figure 5:
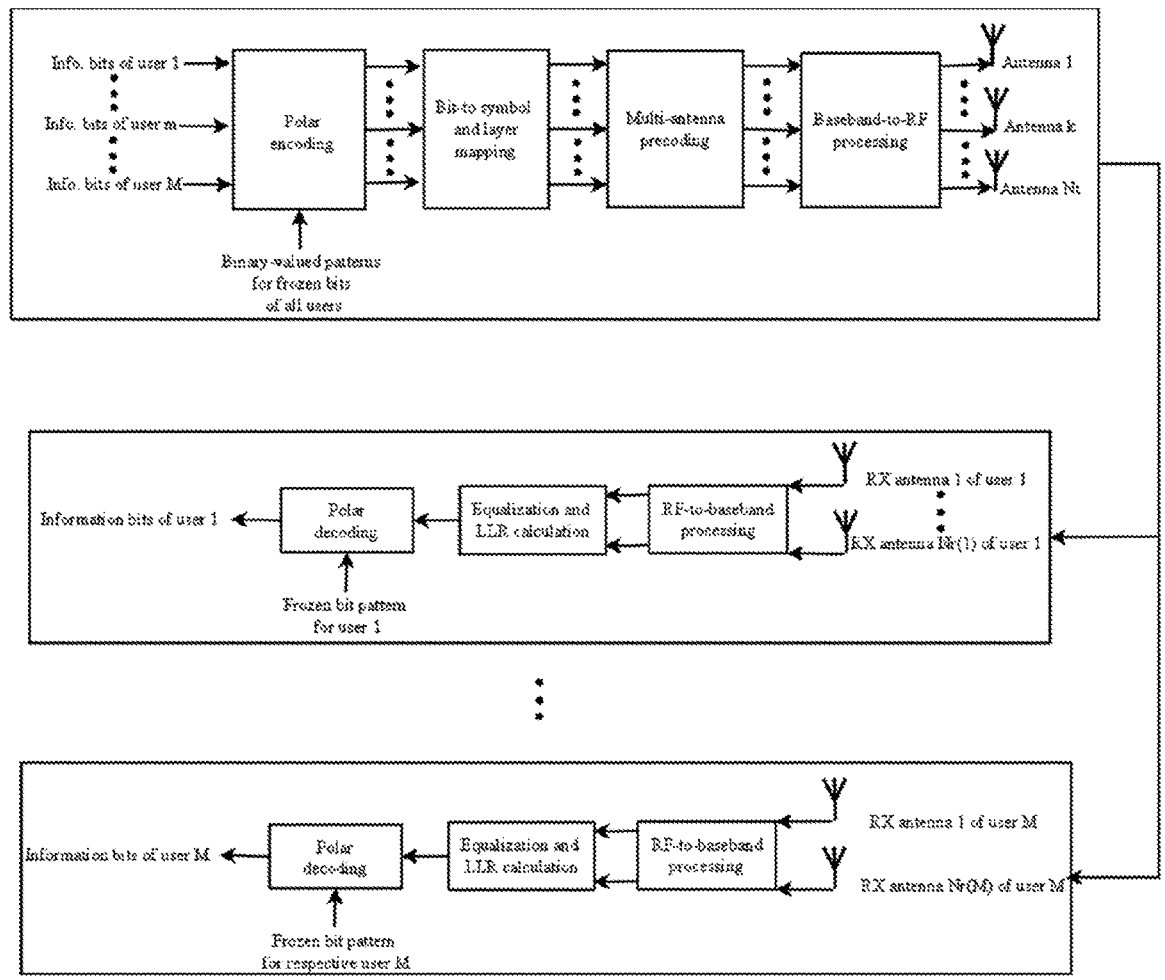
FIG. 5 shows transmission of downlink signal for a MU-MIMO system using the same time-frequency resource for each user and reception of the signal by each user through respective downlink channels.

In the sixth step of the present invention, the transmitter transmits the signals of M users using the same time-frequency resources as given in FIG. 5. At the transmitter, the binary-valued user specific frozen bit pattern sequences to be used in frozen bit locations of the polar encoder are employed and coded bits are mapped to symbols, layer-mapped, precoded and transmitted to the receivers. Due to imperfect CSIT and/or user grouping, the selected precoder in the transmitter can have limited performance to separate signals in the spatial domain, causing significant multi-user interference at the receivers and degrading the overall system performance. By using unique frozen bit pattern signatures for each user, the codeword of the different users can be separated despite multi-user interference resulting from imperfect multi-user interference mitigation or imperfect CSIT. Consequently, the system can operate more robustly in imperfect interference mitigation and/or dynamic environments.

Figure 6:
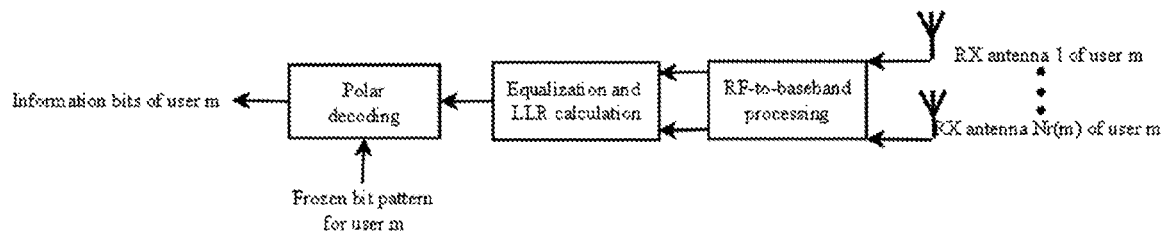
FIG. 6 shows the procedure to receive and process the received signal at the receiver.
Figure 7:
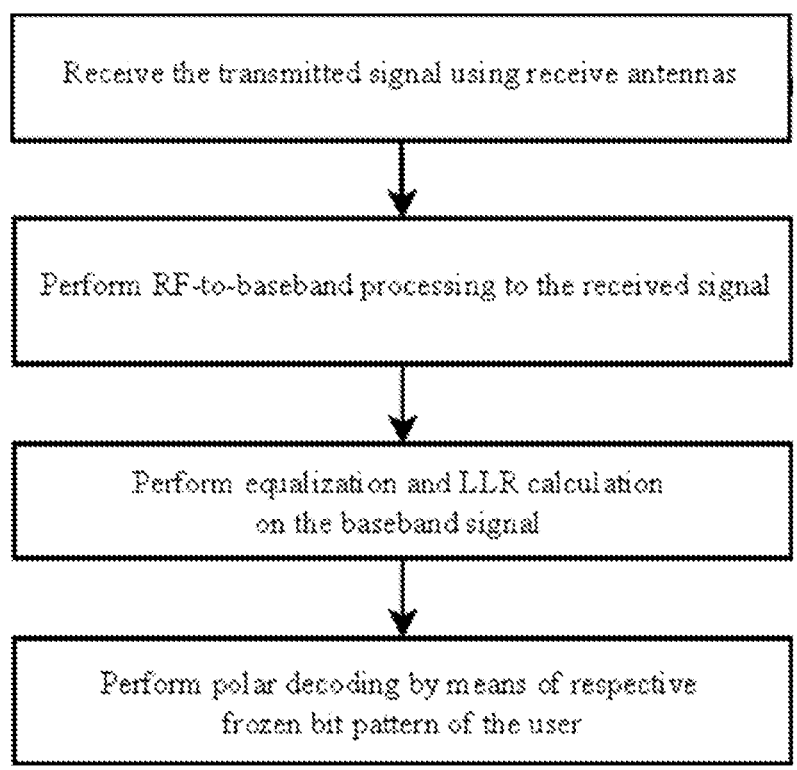
FIG. 7 shows the flow-chart of the operations performed at the receiver side of each user.

After transmitting the downlink signal, each user receives and processes the received signal as given in FIG. 5 The procedure to receive and process the received signal at the receiver of each user is given in FIG. 6. Herein, the receiver receives the transmitted signal and an RF-to-baseband conversion is applied onto the received signal. Then, equalization and LLR calculation are performed and a polar decoder which employs the corresponding binary-valued user-specific pattern sequence assigned to the user in the transmitter in frozen bit locations. The flow-chart of the operations performed at the receiver side of each user is given in FIG. 7.

In the seventh step of the present invention, the signals of M users transmitted through M downlink radio channels is received by each user. Herein, the transmitted signal is generated at the transmitter by employing the binary-valued user-specific pattern sequence to be used in frozen bit locations of the polar encoder, mapping coded bits to symbols, layer-mapping, precoding and performing baseband-to-RF-processing. Signal of all users are transmitted at the same time and frequency resource blocks In the eighth step of the present invention, RF-to-baseband processing is performed onto the received signal at each user. In one example, this step includes the operations for obtaining the baseband signal from received RF signal. Herein, the transmitted signal at the transmitter is baseband-to-RF processed according to multiple transmit antenna downlink transmission using an orthogonal multi-carrier modulation including but not limited to CP-OFDM. Herein, the transmitted signal at the transmitter is baseband-to-RF processed according to multiple transmit antenna downlink transmission using a single-carrier modulation including but not limited to DFT-S-OFDM. In another example, transmitted signal at the transmitter is baseband-to-RF processed according to multiple antenna downlink transmission using a non-orthogonal multi-carrier modulation including but not limited to f-OFDM, FBMC, UFMC.

In the ninth step of the present invention, the detection of each user signal is performed on the baseband signal using an equalizer and an LLR calculator.

In one example, the equalizer may be a Zero-Forcing (ZF) equalizer. In another example, the equalizer may be a Matched-Filter (MF). In another example, the equalizer may be a Minimum-Mean Square Error (MMSE) equalizer.

In the tenth and final step of the present invention, the decoding of each user data is performed on the LLRs using a polar decoder, which employs the corresponding binary-valued pattern sequence to be used in frozen bit locations. Herein, the frozen bit patterns do not carry any specific system identification information for the transmitter or receiver unit, and they are used and designed to aid the polar decoder in the decoding procedure to improve the performance of a downlink MU-MIMO system under multi-user interference, which can occur due to imperfect CSI or user grouping at the transmitter. The performance improvement with user-specific frozen bit patterns of the polar codes for downlink MU-MIMO systems is closely related to the number of "aids" given to the polar decoder during the decoding process. The probability of incorrect detection decreases as the number of different partial-sum values between frozen bit patterns of users increases. This fundamental observation is the main reason behind the improvement of the performance of downlink MU-MIMO systems with disclosed invention, therefore binary valued user-specific frozen pattern sequences are used for polar decoding at the receiver of each user.

In an exemplary embodiment, a polar decoder is a Successive Cancellation (SC) based decoder. In one example, SC-based decoder is SC decoder. In another example, SC-based decoder is SC-stack decoder. In still another example, SC-based decoder is SC-flip decoder.

SC is a low-complexity algorithm in which bits are decoded sequentially and one at a time. SC decoder takes the channel observations and the frozen bit locations as inputs and calculates the bit estimates. Channel observations may be taken in hard decisions (bits) or soft decisions. In an exemplary embodiment, soft decision form is log-likelihood ratio (LLR), which is defined as $$\lambda = \frac{P(y|x=0)}{P(y|x=1)}.$$

In SC decoding, bit decisions are made according to the following:

for $i = 0$ to N-1 do
   if $i \in A^c$ then
      1.   $\hat{u}_i \leftarrow u_i$ ii.elseif $ln\left(\frac{W_N^{(i)}\left(y, u_0^{i-1}|u_i=0\right)}{W_N^{(i)}\left(y, u_0^{i-1}|u_i=1\right)}\right) \geq 0$ then 1.   $\hat{u}_i \leftarrow 0$ iii.else 1.   $\hat{u}_i \leftarrow 1$ iv.end end Herein, $u_i$ denotes the the i-th uncoded bit, $\hat{u}_i$ denotes the bit estimation for $u_i$ at the decoder output, $$W_N^{(i)}\left(y, u_0^{i-1}|u_i=u\right)]$$

is the conditional channel transition probability of polarized i-th bit channel. The likelihood functions $$ln\left(\frac{W_N^{(i)}\left(y, u_0^{i-1}|u_i=0\right)}{W_N^{(i)}\left(y, u_0^{i-1}|u_i=1\right)}\right)$$

are calculated sequentially in SC decoding.

An SC decoder has a complexity order $O(Nlog_2 N)$. A full parallel implementation of SC decoder has 2N-2 latency.

In an exemplary embodiment, a polar decoder is Successive-Cancellation List (SCL) decoder. Successive-Cancellation List (SCL) decoding algorithm is based on SC decoding algorithm. SCL decoders achieve better error performance than SC decoders, while having higher complexity than SC decoders. SCL decoders keep L paths during decoding to improve the error performance. The paths are formed during the decision making stages of SC decoding, where a SC decoder makes a hard decision and a SCL decoder splits into alternative decision paths. When the number of paths exceed the maximum number of paths, which is L, paths are eliminated according to a metric until L paths remain. The decision path is chosen among the surviving L paths at the end of decoding process according to a metric. Alternatively, a path that satisfies a CRC check is chosen as the decision path is chosen among the surviving L paths if polar code is concatenated with a CRC code.

In polar coding, a polar decoder decodes the information bits for a user of interest by using inputs produced by the LLR calculator, frozen bit locations and binary-valued user-specific frozen bit pattern sequence to be used in frozen bit locations for the respective user. Also, frozen bit locations and frozen bit values should be identical in a polar encoder and a polar decoder for obtaining the information bits correctly from a polar code codeword by a polar decoder. A polar decoder cannot decode a polar code codeword correctly with the maximum probability that can be achieved if the correct frozen bit values are not known by polar decoder. As a result, the probability of a polar decoder to decode information bits of a user of interest correctly is increased in the presence of multi-user interference.

Figure 8:
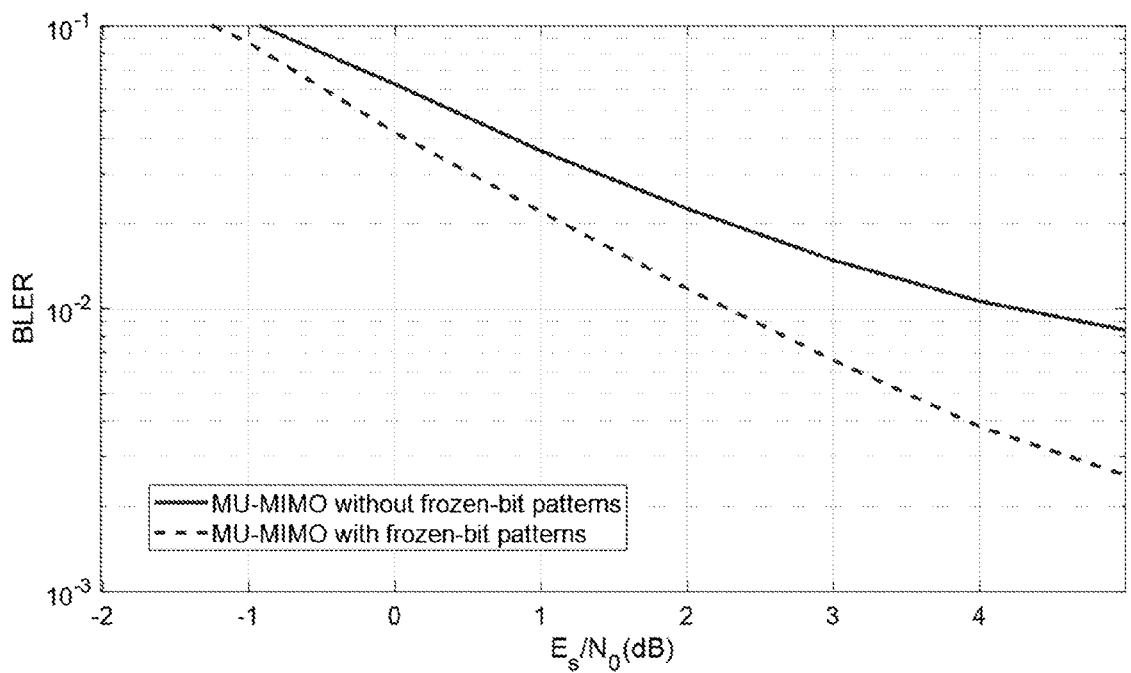
FIG. 8 illustrates the block error rate performances of MU-MIMO with and without the disclosed method with respect to signal-to-noise ratio for Rayleigh channel model.

FIG. 8 compares the block error rate performances of MU-MIMO with and without the disclosed method with respect to signal-to-noise ratio under Rayleigh fading channel model MU-MIMO with the disclosed method uses unique randomly generated binary-valued user-specific frozen bit pattern sequences for each user. An OFDM symbol with 256 subcarriers is transmitted in both schemes. A (512,64) polar code is employed. MRT precoder is used at the transmitter. There are 8 antennas at the transmitter and 16 users with single receive antenna. Perfect CSI at the transmitter and receiver is assumed. A CRC code of length-11 is concatenated with polar code at transmitter. A CRC-based SIC receiver is employed at receiver. A SCL decoder with L=16 is employed at receiver. FIG. 8 shows that the disclosed method provides significant error performance gain compared to the case without the disclosed method. For 0.01 BLER target, 2 dB improvement indicates the benefit of frozen bit patterns in downlink MU-MIMO systems. In the considered scenario, the error performance is improved with the disclosed method even under perfect CSIT assumption, since the system is overloaded. This shows that the disclosed enhancement method not only improves the error performance, but can also increase the system capacity as it can support a higher number of users in the system. It is also important to note that using binary-valued user-specific frozen bit patterns for each user does not change polar encoding and decoding complexity compared to the case without the disclosed method, therefore the performance improvement can be achieved without increasing the complexity of the system.

Figure 9:
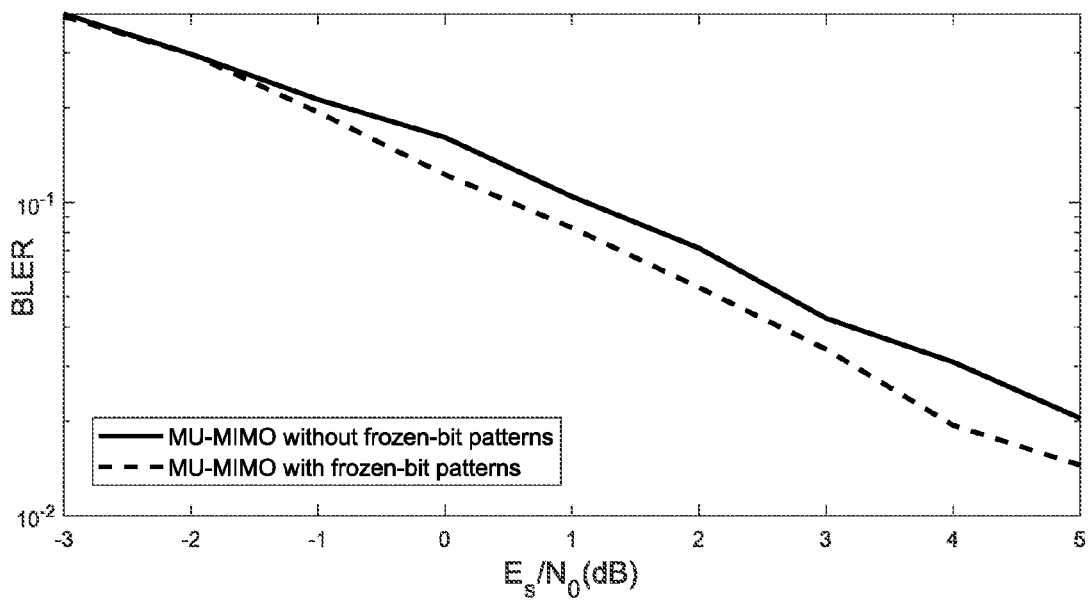
FIG. 9 illustrates the block error rate performances of MU-MIMO with and without the disclosed method with respect to signal-to-noise ratio for TDL-A channel model.

FIG. 9 compares the block error rate performances of MU-MIMO with and without the disclosed method with respect to signal-to-noise ratio in TDL-A channel model with 30 ns delay spread MU-MIMO with the disclosed method uses unique randomly generated binary-valued user-specific frozen bit pattern sequences for each user. An OFDM symbol with 256 subcarriers is transmitted in both schemes. A (512,64) polar code is employed. A CRC code of length-11 is concatenated with polar code at transmitter. A CRC-based SIC receiver is employed at each receiver. A SCL decoder with L=16 is employed at each receiver. MRT precoder is used at the transmitter. There are 8 antennas at the transmitter and 4 users with single receive antenna. Each user has mobility with 100 km/h, therefore the channel varies in time with corresponding Doppler spread for each user. Perfect CSI at the receiver is assumed. The precoder is calculated according to the CSI-feedback received at the beginning of a 14 symbol slot. The same precoder is used during the entire transmission slot and is not updated even though the channel varies, hence becoming outdated towards the end of the slot. FIG. 9 shows that disclosed method provides an error performance gain compared to the case without the disclosed method. In the considered scenario, the system is underloaded and the CSIT used for precoder calculation is imperfect after the beginning of the transmission slot as it is not updated. This shows that disclosed enhancement method provides an error performance gain not only when the system is overloaded but also when the CSIT is outdated and system is underloaded, i.e. there are more transmit antennas than number of users. Finally, as the delay between the CSI acquisition and the transmission time increases, the error performance gain is expected to increase as well.

The invention claimed is:

1. A method for enhancing a performance of a downlink multi-user multiple-input multiple-output (MU-MIMO) system with insufficient multi-user interference suppression based on binary-valued user-specific frozen-bit patterns of polar codes, comprising steps of:

determining a binary-valued user-specific frozen bit pattern sequence to be used in frozen bit locations for each user, performing a channel encoding on uncoded information bits of each user to generate coded bits via a polar encoder by using the binary-valued user-specific frozen bit pattern sequence to be used in the frozen bit locations of each user to improve the performance of the downlink MU-MIMO system, mapping of the coded bits of each user to symbols to generate a symbol sequence and performing a layer mapping for the symbol sequence, applying a multi-antenna precoding to obtain precoded symbols, performing a baseband-to-RF processing onto the precoded symbols, transmitting a baseband-to-RF processed signal of each user at same time-frequency resources using transmit antennas, receiving a transmitted signal at each user using receive antennas, wherein the transmitted signal is transmitted through respective downlink channels, applying an RF-to-baseband conversion to a received signal at each user, performing an equalization and a log-likelihood ratio (LLR) calculation on a baseband signal for detecting each user signal, decoding each user data using calculated LLRs and a polar decoder at each user by employing a corresponding binary-valued user-specific frozen bit pattern sequence used in the frozen bit locations to improve the performance of the ef-downlink MU-MIMO system.

2. The method according to claim 1, wherein each bit of the binary-valued user-specific frozen bit pattern sequence to be used in the frozen bit locations for each user is generated according to a Bernoulli distribution with parameter p, and the parameter p represents a probability of a value of the each bit equal to 1, and 1-p is a probability of the value of each bit equal to 0.

3. The method according to claim 2, wherein each bit generated according to the Bernoulli distribution with the parameter p is different for each user.

4. The method according to claim 1, wherein each bit of the binary-valued user-specific frozen bit pattern sequence to be used in the frozen bit locations for each user is chosen to allow a number of different partial-sums between any user pairs in the downlink MU-MIMO system to be above a predetermined partial-sum number threshold.

5. The method according to claim 4, wherein the chosen bit allowing the number of different partial-sums between any user pairs in the downlink MU-MIMO system to be above the predetermined partial-sum number threshold is stored in a table in a transmitter to be processed during the channel encoding, and a receiver unit also explicitly knows the binary-valued user-specific frozen bit pattern sequence.

6. The method according to claim 1, wherein the step of determining the binary-valued user-specific frozen bit pattern sequence to be used in the frozen bit locations is done by selecting a sequence among a preset generated pattern sequence table according to the-index information sent from a receiver unit.

* * * * *